(No Model.)
J. H. HORNE.
MECHANISM FOR TRANSMITTING POWER.
No. 443,080. Patented Dec. 16, 1890.
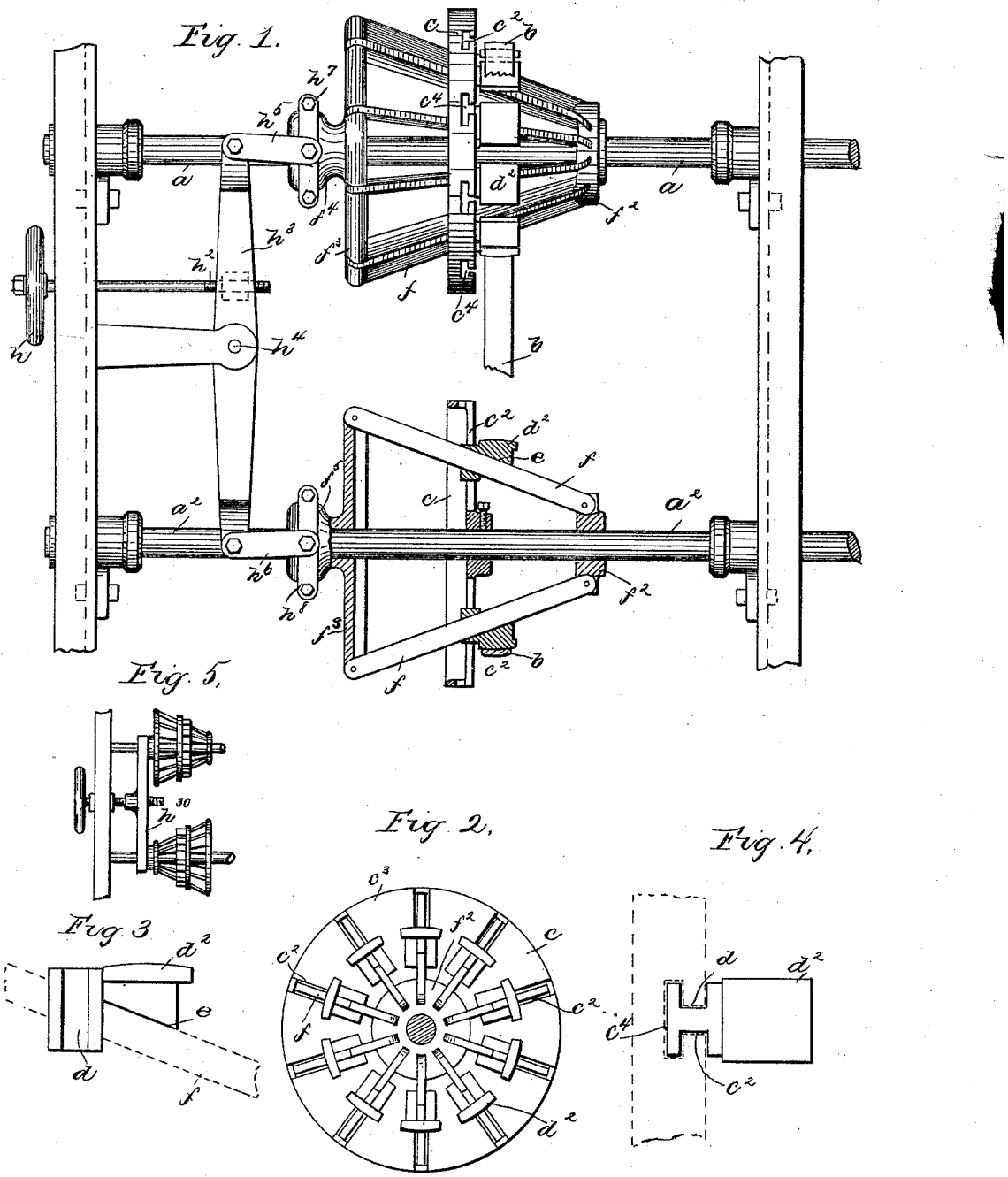
Witnesses.
Jas. J. Maloney.
M. E. Hill.
Inventor.
John H. Horne,
by Jno. P. Dinsmore
Att'y

UNITED STATES PATENT OFFICE.

JOHN H. HORNE, OF LAWRENCE, MASSACHUSETTS.

MECHANISM FOR TRANSMITTING POWER.

SPECIFICATION forming part of Letters Patent No. 443,080, dated December 16, 1890.

Application filed April 25, 1890. Serial No. 349,486. (No model.)

*To all whom it may concern:*

Be it known that I, JOHN H. HORNE, of Lawrence, county of Essex, State of Massachusetts, have invented an Improvement in Mechanism for Transmitting Power, of which the following description, in connection with the accompanying drawings, is a specification, like letters on the drawings representing like parts.

My invention relates to mechanism employed for transmitting power, and is embodied in an expanding pulley of novel construction and means for operating a pair of such pulleys by which the ratio of speed between a driving and a driven shaft connected by belting may be varied while the shafts are running.

The invention is embodied in apparatus comprising a disk or wheel secured to the shaft from or to which power is to be applied by belting, the said disks having a number of substantially radial guides in which work blocks each provided with a portion of the periphery of a pulley, so that by simultaneously moving all the said blocks or pulley-segments inward toward the center of their carrying-disk the pulley is made of smaller diameter and by moving them outward the pulley is made of larger diameter. The said blocks are simultaneously moved inward or outward by a corresponding number of inclined guides, all connected with a frame having a longitudinal movement with relation to the shaft, the said guides all converging toward the shaft and constituting what may be called a "skeleton" or "open cone," which when moved so as to bring its larger end nearest the carrying-disk throws the pulley-segments or belt-holder outward, making the pulley of larger diameter, and when moved in the opposite direction, so as to bring its smaller end adjacent to the said carrying-disks, moves the said pulley-segments inward, so as to make the pulley of smaller diameter. When a driving and a driven shaft are connected by belts working over pulleys of this kind, it is necessary or desirable that one pulley should be expanded while the other is correspondingly contracted, so as to maintain the belt of substantially uniform tension while varying the relative speed of the shafts, and the pulley expanding and contracting devices are, in accordance with the present invention, connected with a single actuator, the movement of which in one direction expands one and contracts the other pulley, while its movement in the opposite direction produces the opposite effect.

Figure 1 shows two shafts provided with mechanism for transmitting power from one to the other in accordance with this invention, the appliances on one of the shafts being shown mainly in elevation, while those on the other shaft are shown in longitudinal section. Fig. 2 is an end elevation of one of the pulleys; Figs. 3 and 4, a side elevation and plan view, respectively, of one of the movable pulley-segments; and Fig. 5, a side elevation showing a modified arrangement.

The shafts $a$ $a^2$, Fig. 1, may be employed in any machinery in which it is desired to vary the relative speed of said shafts, one of which is driven from the other by a belt, (a portion of which is shown at $b$,) and in which it is desired to vary the speed of movement of one shaft with relation to the other, such mechanism being useful, for example, in paper-cutting machines, in which sheets are cut from a continuous webbing fed forward by feed mechanism driven from one of said shafts, as $a$, and acted upon by a cutter driven from the other of said shafts, as $a^2$, so that by varying the relative speed of said shafts $a$ $a^2$ the amount of paper fed between two successive operations of the cutter will be varied and the paper consequently cut into sheets of different length. In order to provide compact and efficient means for varying the relative speed of movement of said shafts, they are provided with expanding pulleys constructed in the following manner, the said pulleys being substantially duplicates one of the other, so that the same reference-letters apply to the corresponding parts of each: The shaft has fixed upon it a disk or carrier $c$, having radial guides $c^2$, shown as slots in the face of the disk, the edges of which slots embrace grooves $d$ (see Figs. 3 and 4) in blocks, each of which is provided with a belt-receiving face or pulley-segment $d^2$, so that when all the blocks are at the same distance from the center of their belt-carrying portions $d^2$ they form a pulley which, although not at all times absolutely circular in shape and not having a continuous periphery, nevertheless affords a suitable belt-supporting surface. The periphery $c^3$ of the disk is provided with openings $c^4$, communicating with the radial guides $c^2$, to enable the pulley-section blocks to be introduced into the said guides, as will be best understood from Fig. 4. By moving all said blocks simultaneously toward and from the center of the disk the pulley is expanded or contracted, and in order to produce such simultaneous movement and to retain the blocks at a given distance from the axis when properly adjusted the said blocks are provided with inclined guideways $e$, which receive inclined guide-bars $f$, connected with disks $f^2$ $f^3$, fitted to slide along the shafts $a$ $a^2$, the said guides $f$ thus constituting a skeleton cone passing through the several segments of the pulley and also through the radial passages in the carrying-disk $c$. The said cones are shown in Fig. 1 as in about intermediate position, making the pulleys of about intermediate size between the extreme sizes which they may be made to assume, and it will be seen that by moving the smaller disk $f^2$ or apex of the cone toward the disk $c$ the pulley-segments $d^2$ will be drawn inward and the diameter of the pulley diminished, while by moving the same in the reverse direction, or by moving the larger end $f^3$ of the cone toward the disk $c$, the pulley-segments will be drawn outward and the diameter of the pulley increased.

If the speed of the shaft $a^2$ is to be increased with relation to that of the shaft $a$, the pulley on said shaft $a$ should be expanded, while that on the shaft $a^2$ is contracted, and by making the expansion of one equal to the contraction of the other the belt will be maintained at a uniform tension, although it will be seen that a change in speed could be effected by varying the size of one of the pulleys while the other remained constant.

In order to expand one pulley and contract the other simultaneously, so as to maintain the proper tension of the belt while varying the relative speed of the shafts, the pulley-segment expanding and contracting devices or cones are connected with common actuating mechanism, shown in this instance as operated by a hand-wheel $h$, Fig. 1, the shaft of which has a threaded portion $h^2$, working in a nut connecting with a lever $h^3$, fulcrumed at $h^4$, at or near its middle, and having its extremities respectively connected by links $h^5$ $h^6$ with rings or collars $h^7$ $h^8$, working in grooves formed in hubs or bosses $f^4$ $f^5$ of the cone-heads $f^3$. By this connection the cones are free to rotate with the shafts $a$ $a^2$ and pulleys thereon, but may be moved longitudinally in the said shafts, the one in one and the other in the opposite direction, by turning the said actuating-lever $h^3$ on its fulcrum, and by turning the said lever in one direction it will be seen that one pulley will be expanded while the other is contracted, and by turning it in the opposite direction the pulley which was previously expanded will be contracted and the one which was contracted will be expanded, so that any desired variation may be made between the relative speeds of the shafts within the limits afforded by the maximum and minimum sizes of the pulleys, while for any given position the desired relative speed is maintained with great uniformity, as the construction of the pulleys almost entirely precludes slipping of the belts and entirely precludes any variation in the diameter of the part that the belt is running upon, this being a great advantage over cone-pulleys, in which a slight variation in position of the belt causes a corresponding variation of speed and it is extremely difficult to keep the belt running exactly on one part of the pulley.

If desired, the position of the pulley-expanding cones on their shafts may be opposite one another, as shown in Fig. 5, in which case a simultaneous movement of both cones in the same direction will expand one pulley and correspondingly contract the other, and with such construction said cones may be connected with a cross head or yoke $h^{30}$, for shifting them, which moves so as to carry both ends in the same direction instead of having the rocking movement, such as that of lever $h^3$. (Shown in Fig. 1.)

I claim—

1. An expansion-pulley comprising a carrier-disk provided with radiating guides, pulley-segments having guide portions working therein, and a number of connected inclined guides extending through said carrier-disk and engaging one with each pulley-segment, said inclined guides constituting a skeleton cone movable parallel with the axis of rotation of the pulley, whereby said segments may be simultaneously moved outward or inward on their guides, substantially as described.

2. The combination of a driving and a driven shaft, each provided with an expansion-pulley composed of a carrying-disk and pulley-segments movable in guides therewith, connected sets of inclined guides extending through the said disk and engaging one with each of said segments, and actuating mechanism connected with both said sets of segment-actuating guides, as described, whereby one set of segments is thrown outward, while the other set is correspondingly thrown inward, substantially as described.

In testimony whereof I have signed my name to this specification in the presence of two subscribing witnesses.

JOHN H. HORNE.

Witnesses:
JOS. P. LIVERMORE,
M. E. HILL.